United States Patent [19]
Ito et al.

[11] Patent Number: 6,109,534
[45] Date of Patent: Aug. 29, 2000

[54] HOT WATER-TYPE HEATING DEVICE

[75] Inventors: Koichi Ito; Yoshihiko Okumura, both of Kariya; Yoshimitsu Inoue, Chiryu; Hikaru Sugi, Nagoya, all of Japan

[73] Assignee: Denso Corporation, Kariya, Japan

[21] Appl. No.: 08/895,667

[22] Filed: Jul. 17, 1997

[30] Foreign Application Priority Data

Jul. 19, 1996 [JP] Japan ................................. 8-191012

[51] Int. Cl.⁷ .................................................. B60H 1/02
[52] U.S. Cl. ...................................................... 237/12.3 B
[58] Field of Search ............................ 237/8 R, 8 A, 237/8 C, 12.3 B

[56] References Cited

U.S. PATENT DOCUMENTS

| 2,749,050 | 6/1956 | Booth . |
| 3,523,644 | 8/1970 | Kozinski . |
| 4,560,104 | 12/1985 | Nagumo et al. . |
| 5,048,752 | 9/1991 | Hintennach et al. .................... 237/2 A |
| 5,184,773 | 2/1993 | Everingham . |

FOREIGN PATENT DOCUMENTS

| 8-121627 | 5/1996 | Japan . |
| A-8-121627 | 5/1996 | Japan ................................. 237/12.3 B |
| 637051 | 2/1949 | United Kingdom . |
| 1298013 | 2/1970 | United Kingdom . |
| 2009893 | 12/1978 | United Kingdom . |
| 2280258 | 1/1995 | United Kingdom . |
| 2281613 | 3/1995 | United Kingdom . |
| 2290123 | 12/1995 | United Kingdom . |

OTHER PUBLICATIONS

Japanese Patent Application Laid Open No. 8–121627 (NIPPONDENSO) & WPI Abstract Accession No. 96–290069/199630.

Primary Examiner—Henry Bennett
Assistant Examiner—Derek S. Boles
Attorney, Agent, or Firm—Harness, Dickey & Pierce, PLC

[57] ABSTRACT

To control fluctuation of blown air temperature of a heat exchanger to a small value without adding a movable mechanism such as a variable restricting valve, a heat exchanger for heating air by exchanging heat between hot water supplied from a water-cooling type engine and air, a flow control valve for controlling a hot water flow amount to the heat exchanger and a bypass circuit for allowing hot water to flow while bypassing the heat exchanger are provided. A pressure-responsive valve is provided on the bypass circuit and an opening degree of the bypass circuit corresponding to a pressure rise of the hot water is increased. The flow of returning hot water from the heat exchanger is blocked by the flow of the bypass side hot water at a merging portion where the bypass side hot water discharged from the pressure-responsive valve merges with the returning hot water discharged from the heat exchanger.

11 Claims, 10 Drawing Sheets

HOT WATER-TYPE HEATING DEVICE

CROSS-REFERENCE TO RELATED APPLICATION

This application is related to Japanese Patent Application No. Hei 8-191012, incorporated herein by reference.

BACKGROUND OF THE INVENTION

1. Field of the Invention

The present invention relates to heating devices, and particularly relates to a heating device which uses hot water to adjust the temperature of air blown into a vehicle passenger compartment by controlling the amount of hot water flowing therein using a flow control valve.

2. Description of Related Art

A method in which blown air temperature is controlled by controlling a flow amount of hot water to a heat exchanger is known in the art. In such an automotive air conditioner, a water pump driven by the automobile engine is used in a hot water circuit in which the hot water (engine cooling water) is circulated. Therefore, the rotational speed of the water pump fluctuates with fluctuations of engine rotational speed and hot water pressure to the heat exchanger fluctuates to a large degree. Because the fluctuation is a factor of fluctuation of the temperature of the blown air to the heat exchanger, the fluctuation of the hot water pressure causes the hot water flow amount to the heat exchanger to fluctuate.

A hot water-type heating device for controlling the fluctuation of the blown air temperature of the heat exchanger is disclosed in Japanese Patent Application Laid-Open No. Hei 8-121627. This device includes a heat exchanger for heating air by exchanging heat between hot water supplied from a water-cooled type engine for traveling and air, a flow control valve for controlling a flow amount of the hot water supplied to the heat exchanger from the engine and a bypass circuit for allowing hot water to flow therethrough while bypassing the heat exchanger.

A pressure-responsive valve for increasing the opening degree of the bypass circuit corresponding to a pressure rise of the hot water supplied from the engine and a variable restricting valve which moves in response to the movement of the pressure-responsive valve are provided in the bypass circuit. Therefore, the opening degree of the water passage for the hot water passing through the heat exchanger is reduced at the variable restricting valve as the pressure-responsive valve increases the opening degree of the bypass circuit.

Therefore, when the supply pressure of the hot water from the engine rises, the opening degree of the bypass circuit is increased by the pressure-responsive valve and the opening degree of the heat exchanger passage is reduced by a variable restricting valve, and an increase of the amount of flowing hot water to the heat exchanger can be limited to a small value. Thus, fluctuation of the blown air temperature of the heat exchanger can be restrained to a small range with respect to wide-ranging changes of the hot water supply pressure.

In the related art described above, however, because a variable restricting valve other than the pressure-responsive valve is additionally disposed with respect to the flow control valve, a size of the valve device portion of the hot water-type heating device becomes large and the number of components increases, and a corresponding increase in cost cannot be prevented. Further, an operational malfunction of the valve due to deformation or the like of a shaft can occur in a moving mechanism between the pressure-responsive valve and the variable restricting valve.

SUMMARY OF THE INVENTION

The present invention is made in view of the foregoing problems, and an object of the present invention is to provide a hot water-type heating device for restraining fluctuations in the blown air temperature of a heat exchanger to a small range without adding a movable mechanism such as a variable restricting valve.

In order to attain the above-described object, one aspect of the present invention provides a heat exchanger for heating air by exchanging heat between hot water supplied from a hot water supply source and air, a flow control valve for controlling a flow amount of hot water supplied to the heat exchanger from the hot water supply source, a bypass circuit for allowing hot water to flow therein by bypassing the heat exchanger, a pressure-responsive valve for increasing an opening degree of the bypass circuit corresponding to a pressure rise of the hot water supplied from the hot water supply source, and a merging portion for merging bypass side hot water discharged from the pressure-responsive valve with returning hot water discharged from the heat exchanger, so that flow of the returning hot water from the heat exchanger is blocked by flow of the bypass side hot water from the pressure-responsive valve at the merging portion.

When the supply pressure of the hot water from the hot water supply source rises, the valve body of the pressure-responsive valve increases the opening degree of the bypass circuit to control an increase of the flow amount of the hot water to the heat exchanger. Further, at the merging portion, the blocking operation of the flow of returning hot water is provided by the flow of the bypass side hot water, so that fluctuation of the hot water flowing amount to the heat exchanger due to the fluctuation of the supply pressure of the hot water can be restrained to be very small. As a result, temperature fluctuation of the blown air of the heat exchanger with respect to wide-ranging changes of the supply pressure of the hot water can be restrained to be very small.

Further, by using the blocking operation by the flow of the bypass side hot water at the merging portion, the temperature fluctuation of the blown air of the heat exchanger can be restrained to be very small. Therefore, the present invention can provide a highly reliable product with very low cost without requiring an additional movable mechanism such as a variable restricting valve as described above.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Figure 1:
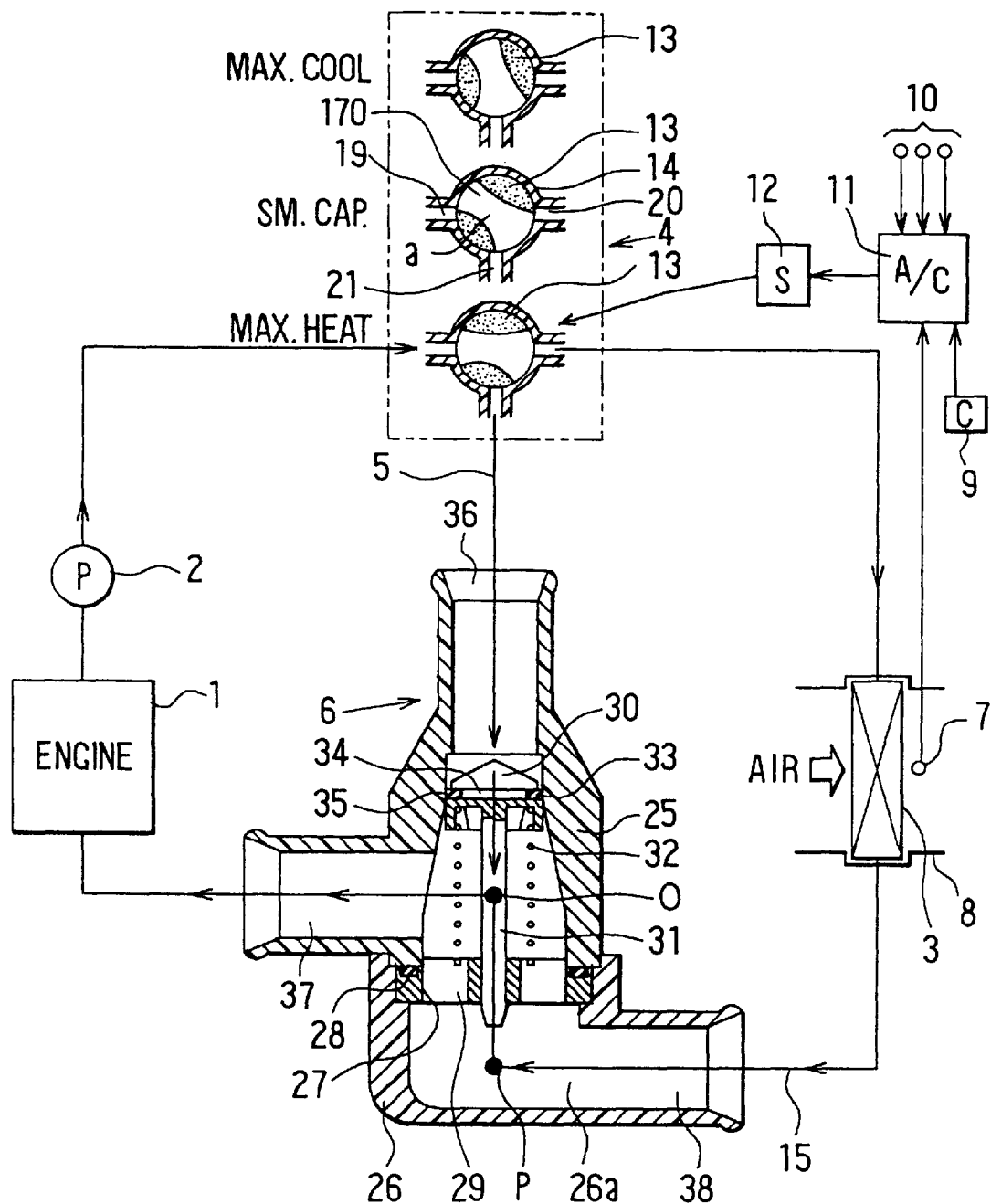
FIG. 1 is a hot water circuit diagram showing a first preferred embodiment of the present invention.

FIG. 1 shows a first embodiment of the present invention as applied to a hot water-type heater apparatus of an air conditioning device for automotive use. Reference numeral 1 denotes a water-cooled type engine for automotive use; 2 denotes a water pump driven by the engine 1 to circulate water in a coolant water circuit (hot water circuit) of the engine 1; 3 denotes a heat exchanger for use as a heater core to exchange heat between hot water supplied from the engine and blown air to thereby heat the blown air; 4 denotes a flow control valve according to the present invention and is a three-way type flow control valve having three hot water inlets/outlets.

Reference numeral 5 denotes a bypass circuit disposed with the heat exchanger 3 in parallel, and 6 denotes a constant differential pressure valve (pressure-responsive valve) which opens when the differential pressure between its sides reaches a previously established specified value and which makes the inlet and outlet pressures of the heat exchanger 3 substantially equal even if the discharge pressure of the water pump 2 fluctuates due to rotational speed fluctuation of the engine 1.

Reference numeral 7 denotes a temperature sensor which is installed within an air duct (heater case) 8 of an automatic air conditioning apparatus provided with the heat exchanger 3 and on an air downstream side of the heat exchanger 3 at a location immediately before a branch point of various vents which lead to the vehicle's passenger compartment.

One vent is an upper face vent for blowing air toward a passenger's face within the passenger compartment. Another vent is a defroster vent for blowing air toward a vehicle front windshield to remove fog from the windshield. A third vent is a foot vent for front seat use for blowing air on the feet of the front seat passengers. Another vent is a foot vent for back seat use for blowing air on the feet of the back seat passengers.

Reference numeral 9 denotes a temperature control for setting a target temperature (the temperature desired by the passenger) for passenger compartment temperature control, and is composed of a switch, variable resistor, or the like which is manually operable by the passenger. Reference numeral 10 denotes a sensor group for detecting environmental factors relating to passenger compartment temperature control of ambient temperature, hot water temperature, amount of sunlight and the like. Numeral 11 denotes an air conditioning controller for generating temperature control signals based on input signals from the sensors 7 and 10 and the temperature control 9 and the like, and is composed of a microprocessor or the like.

Reference numeral 12 denotes a servomotor controlled by temperature control signals from the air conditioning controller 11, and includes a valve body operating device for rotating a valve body 13 of the flow control valve 4. This device is not necessarily an electrical actuator controlled by the air conditioning controller 11 such as the servo 12, but may be a known manually operated mechanism employing levers, wires, or the like.

The above-described valve body 13 has a substantially cylindrical configuration, is made of resin and is disposed and housed rotatably within a valve housing 14 also formed of resin material in a cylindrical configuration. Therefore, the valve body 13 is a rotatable rotor.

A hot water inlet pipe 19 into which hot water flows from the engine 1, a hot water outlet pipe 20 which causes inflowing hot water from the hot water inlet pipe 19 to flow out toward the heat exchanger 3, and a bypass outlet pipe 21 which causes hot water to flow out toward the bypass circuit 5 of the heat exchanger 3 are integrally formed in the housing 14.

Control passages 170 which control a opening surface area of the foregoing pipes 19, 20 and 21 according to a predetermined mutual relationship are formed in the valve body 13. A shaft (not shown) for operating and rotating the valve body 13 protrudes to an outer portion of the valve housing 14, and is interconnected with an electrical actuator such as the servo 12 or a manually operated mechanism employing levers, wires and the like, to rotate and operate the valve body 13 using those devices.

During minute capacity mode in which the hot water flow amount to the heat exchanger 3 is controlled by the flow control valve 4 (i.e., a valve opening degree of 30° or less; according to the present embodiment the maximum valve opening degree is 95°), the valve has a two-state restriction which restricts both the opening area of the hot water inlet pipe 19 and the hot water outlet pipe 20, and moreover the middle portion between the restricting portions of the hot water inlet pipe 19 and the hot water outlet pipe 20 (portion "a" of FIG. 1) communicates with the bypass circuit 5 through an adequately large opening area via the bypass outlet pipe 21 in a fully open state, and so the differential pressure across the heat exchanger 3 can be made sufficiently small.

Next, a detailed structure of the constant differential pressure valve (pressure-responsive valve) 6 as a main portion of the present invention will be explained. The constant differential pressure valve 6 is disposed at a merging point of the bypass circuit 5 and a hot water path 15 at the outlet side of the heat exchanger 3. Two resin housings 25 and 26 are integrally connected by screws or the like and a resin seating plate 27 is fixed water-tightly between both housings through an O-ring (seal member) 28. A plurality of water passage holes 29 having a sufficient opening surface area on the seating plate 27 are provided so that water passage resistance due to the seating plate 27 may be minimized.

Reference numeral 30 denotes a valve body formed with resin in a conical configuration and integrally formed with an end of a shaft portion 31, the shaft portion 31 being engaged movably in an axial direction with a center hole portion of the seating plate 27. A coil spring (spring device)

32 is disposed between the valve body 30 and the seating plate 27, and the valve body 30 is constantly biased to the upper portion (valve-closed direction) of the figure by the spring 32 to contact a valve seat 33 formed on an inner periphery of the housing 25.

In other words, the valve body 30 is operated by a balance between the hot water pressure and a force of the spring which biases the valve body 30 to a lower portion of the figure.

A ring-shaped groove 34 is formed on an outer periphery of the conical portion of the valve body 30. A seal member 35 composed of elastic material such as rubber is disposed in the groove 34 to increase the sealing effect when the valve body 30 is closed.

Accordingly, when a pressure difference between an inlet 36 formed in the housing 25 and an outlet 37 formed in the housing 26 reaches a predetermined value, the valve body 30 moves downward in the Figure by opposing the force of the spring 32, and the valve body 30 opens. Therefore, an amount of downward movement of the valve body 30 is increased corresponding to a rise in pressure of the hot water from the inlet 36 so that an opening degree of the bypass circuit 5 is increased. Further, a second inlet 38 in which the hot water from the hot water path 15 in the outlet side of the heat exchanger 3 is formed in the housing 26.

Accordingly, the first and the second inlets 36 and 38 are provided in the housings 25 and 26 and the common outlet 37 is provided, so that a merging portion "O" for merging the bypass side hot water passing through the valve body 30 with returning hot water discharged from the heat exchanger 3 is formed in the housing 25. In the present embodiment, the merging portion "O" is constructed to make the bypass side hot water from the valve body 30 and the returning hot water from the heat exchanger 3 merge from opposite directions.

That is, in the housing 26, a bending path 26a bent in an L-shape in the present embodiment is formed in a downstream portion of the second inlet 38 and the returning hot water from the heat exchanger 3 flows by curving in the L-shape at a curving point P. Therefore, although the bypass side hot water from the valve body 30 flows downward in the Figure, the returning hot water from the heat exchanger 3 is set to flow upward in the Figure from the curving point P, so that both flows of the hot water can be merged at the merging portion "O" in directions in which one direction is shifted by 180° from the other.

Next, a mode of operation according to the first embodiment having the above-described structure is explained. At the time of maximum heating capacity, the valve body 13 of the flow control valve 4 is rotated by the servo 12 or a manually operated mechanism to a position of maximum opening degree (for example, valve opening degree: a position at 95°).

Therefore, the control passages 170 of the valve body 13 overlap the hot water inlet pipe 19 of the valve housing 14 and the hot water outlet pipe 20 to open both pipes 19 and 20 with a maximum surface area completely. Meanwhile, the control passage 170 does not open the bypass outlet pipe 21, so that the pipe 21 is in a fully closed state.

As a result, the hot water from the engine 1 flows to the heat exchanger 3 at a maximum flow amount and does not flow in the bypass circuit 5. Thus, the heat exchanger 3 can have a maximum heating capacity.

Next, in a maximum cooling mode (when the air conditioning apparatus for automotive use is not equipped with a cooling function, blowing of air is only at a time of stopping of heating), the valve body 13 of the flow control valve 4 is rotated by the servo 12 or manually operated to a position of opening degree at zero. At the position of opening degree at zero, the control passage 170 of the valve body 13 overlaps the bypass outlet pipe 21, so that the pipe 21 is fully opened and the hot water outlet 20 is fully closed.

Meanwhile, a portion of the control passage 170 overlaps the hot water inlet pipe 19 and the hot water inlet pipe 19 is not closed fully and establishes a minimum opening surface area equivalent to a $\phi 2$ round hole.

Because the flow of the hot water from the hot water inlet pipe 19 to the bypass outlet pipe 21 can be continued by the above-described valve body portion, occurrence of noise from a water hammer phenomenon due to sudden interruption of the flow of the hot water can be prevented.

Next, in a minute capacity mode, for example, the valve body is rotated to a valve opening degree of 30° or less, so that the control passage 170 overlaps both hot water inlet pipe 19 and the hot water outlet pipe 20 to a small extent. A state of two-stage restriction which restricts both opening area of the hot water inlet pipe 19 and the opening area of the hot water outlet pipe 20 is obtained. Moreover, the middle portion (portion "a" in FIG. 1) of the restricting portions of the hot water inlet pipe 19 and the hot water outlet pipe 20 are connected to the bypass circuit 5 with a sufficiently large opening area by the bypass outlet pipe 21 which is fully closed, so that the pressure of the middle portion "a" can be lowered.

As a result, because the differential pressure across the heat exchanger 3 can be made sufficiently small, the change in hot water flow (ultimately the change in the temperature of air blown into the passenger compartment) with respect to the change in degree of valve opening (valve body rotational angle) can be alleviated without requiring a particularly small opening area. That is, control gain of the blown air temperature can be reduced, so that the temperature of the air blown into the passenger compartment can be precisely controlled.

Next, during a transition from minute heating capacity to large heating capacity, for example, the valve body 13 is rotated from a rotational position exceeding a degree of valve opening of 30° to rotational position of less than 95°; however, even at a valve body rotational position such as this, control gain can similarly be reduced by the above-described two-stage restriction, so that the temperature of the blown air to the passenger compartment can be precisely controlled.

Figure 2:
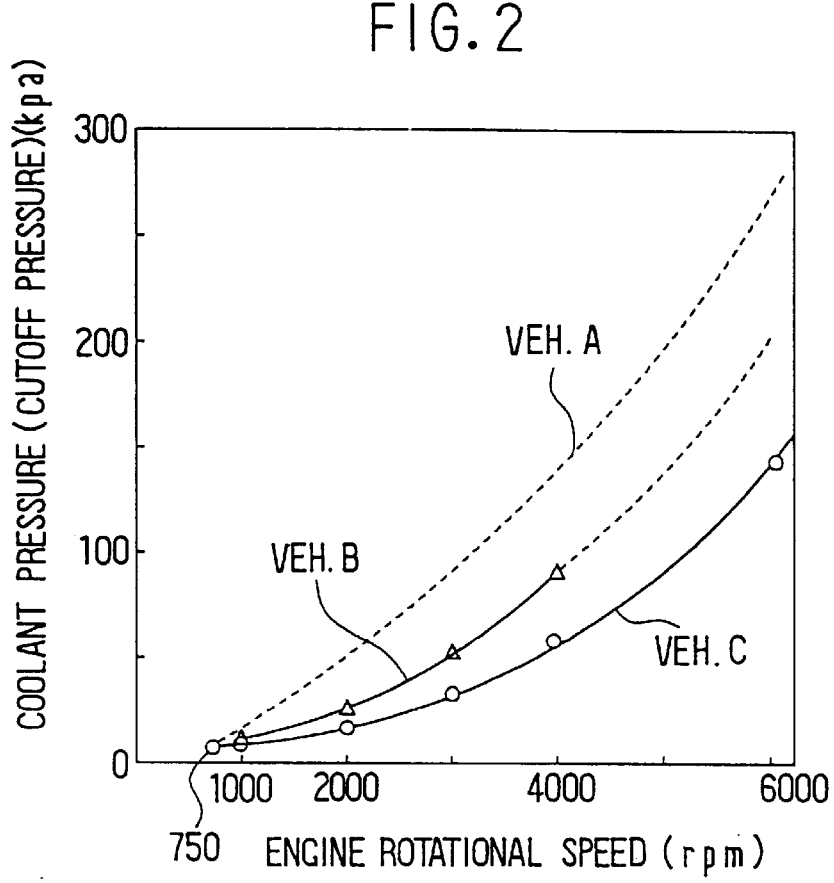
FIG. 2 is a graph of a relationship between engine rotational speed and hot water pressure (restricting pressure) in the first embodiment.

In such an engine which constitutes the hot water supply source of the automotive air conditioning apparatus, rotational speed changes largely in accordance with changes in traveling conditions of a vehicle (concretely, large change from about 750 rpm at idling to about 6000 rpm at a high rotational speed), so that the hot water supply pressure from the engine 1 changes greatly according to changes in traveling conditions. FIG. 2 shows a relationship between the hot water supply pressure from the engine 1 and engine rotational speed, and a vertical axis indicates a closing pressure in an opening valve state of a thermostat of the engine hot water circuit as the hot water supply pressure.

As described above, a great change in the hot water supply pressure becomes a great disturbance factor with respect to the hot water flow control by the flow control valve 4 and the temperature control of the blown air.

In the present embodiment, fluctuation of the hot water flow amount to the heat exchanger 3 due to the change of the hot water supply pressure from the engine 1 is canceled effectively by devising the constant differential pressure valve 6 provided at the bypass circuit 5 and a merging shape of the hot water at the constant differential pressure valve 6.

That is, in the constant differential pressure valve 6, when the hot water supply pressure from the engine 1 rises and the differential pressure across the valve body 30 becomes higher than a predetermined pressure determined by the spring 32, the valve body 30 moves downward in FIG. 1 and opens and a clearance between the valve body 30 and valve seat 33 fluctuates corresponding to the differential pressure, so that the constant differential pressure valve 6 operates to maintain the pressure difference between the inlet 36 and the outlet 37 at a constant value.

Because a size of the constant differential pressure valve 6 is limited in practice, it is difficult to absorb the fluctuation of the hot water supply pressure in a large range only using the constant differential pressure valve 6.

In the present embodiment, the fluctuation of the hot water supply pressure is effectively absorbed by devising the merging shape in the downstream of the constant differential pressure valve 6. That is to say, the returning hot water from the heat exchanger 3 is curved at the curving point P and flows upward in the Figure from the curving point P, so that the returning hot water from the heat exchanger 3 merges with the hot water in the bypass side, which flows out from the valve body 30 of the constant differential pressure valve 6 in the opposite direction in which one direction is shifted at 180° from the other direction.

Therefore, the flow of the hot water in the bypass side interferes in the flow of the returning hot water from the heat exchanger 3, so that the flow of the returning hot water can be blocked. As a result, an increase in the hot water flow amount to the heat exchanger 3 at a time of high rotation of the engine can be effectively prevented by the blocking operation of the bypass side hot water so that the temperature rise of the blown air of the heat exchanger 3 can be regulated to a small amount.

In the present embodiment, the merging portion "O" for merging the bypass side hot water passing through the valve body 30 of the constant differential pressure valve 6 with the returning hot water from the heat exchanger 3 is formed in the housing 25 of the constant differential pressure valve 6 and is disposed adjacent to the valve body 30 of the constant differential pressure valve 6 so that the bypass side hot water can interfere with the returning hot water before dynamic pressure of the bypass side hot water is reduced. Therefore, the blocking operation can be improved by using the dynamic pressure of the bypass side hot water effectively.

(Second Embodiment)

Figure 3:
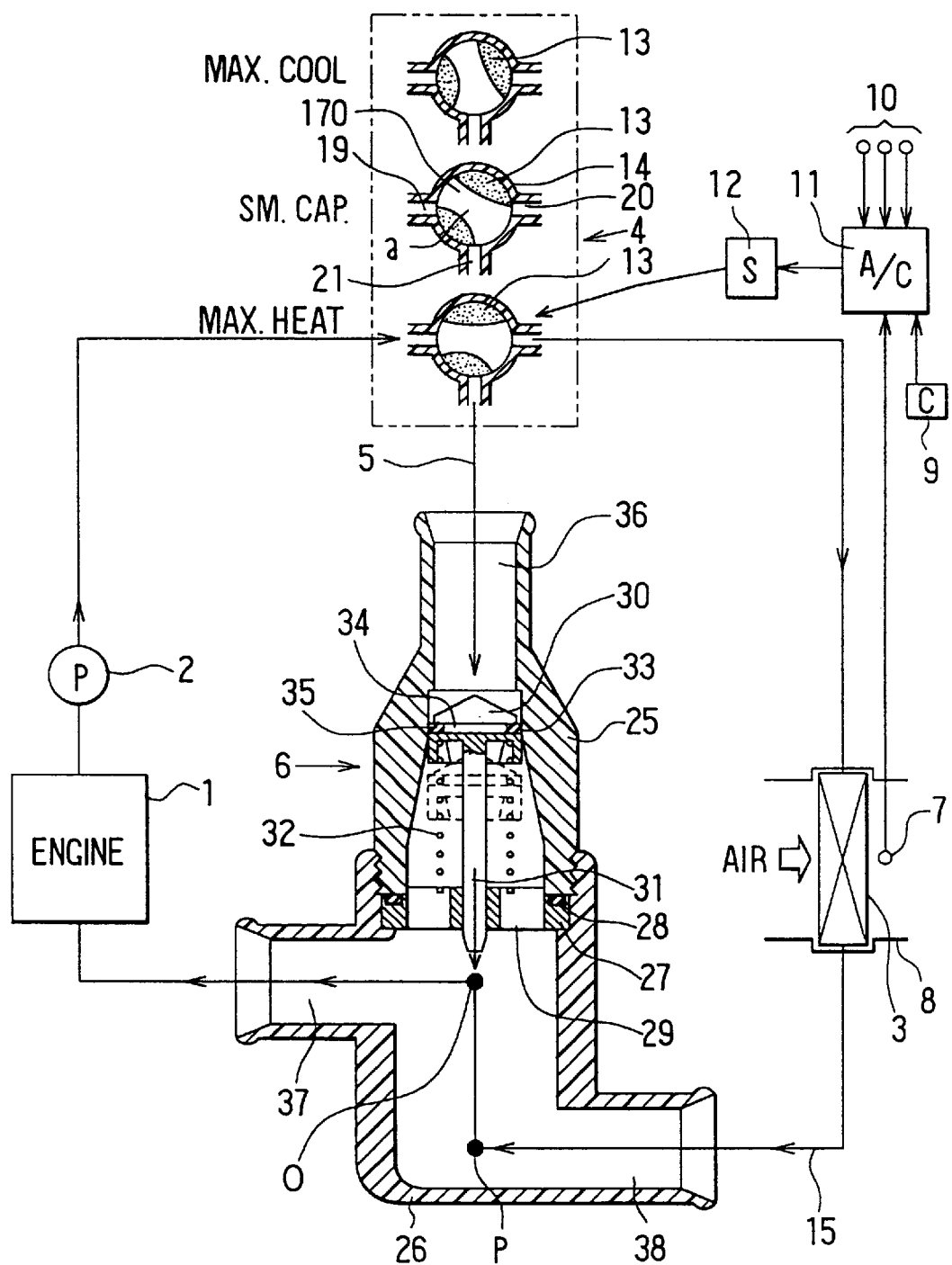
FIG. 3 is a hot water circuit diagram showing a second preferred embodiment of the present invention.

In the first embodiment in FIG. 1, although the merging portion "O" between the bypass side hot water and the returning hot water from the heat exchanger 3 is disposed at the middle portion (the middle portion of the coil spring 32) between the valve body 30 of the constant differential pressure valve 6 and the seating plate 27, in a second embodiment shown in FIG. 3, members of the constant differential pressure valve 6 are all held in the housing 25 in the upper side, so that the merging portion "O" is disposed in the downstream side below the seating plate 27 of the constant differential pressure valve 6. That is, in the second embodiment, the merging portion "O" and the curving point P are positioned in the housing 26 in the lower side.

In the second embodiment, compared to the first embodiment, the position of the merging portion "O" is far away from the valve body 30 of the constant differential pressure valve 6, so that the fact that dynamic pressure generated at a restricting passage by the valve body 30 and a valve seat 33 is reduced at the merging portion "O" is different from the first embodiment. Other points are the same as the first embodiment.

(Third Embodiment)

Figure 4:
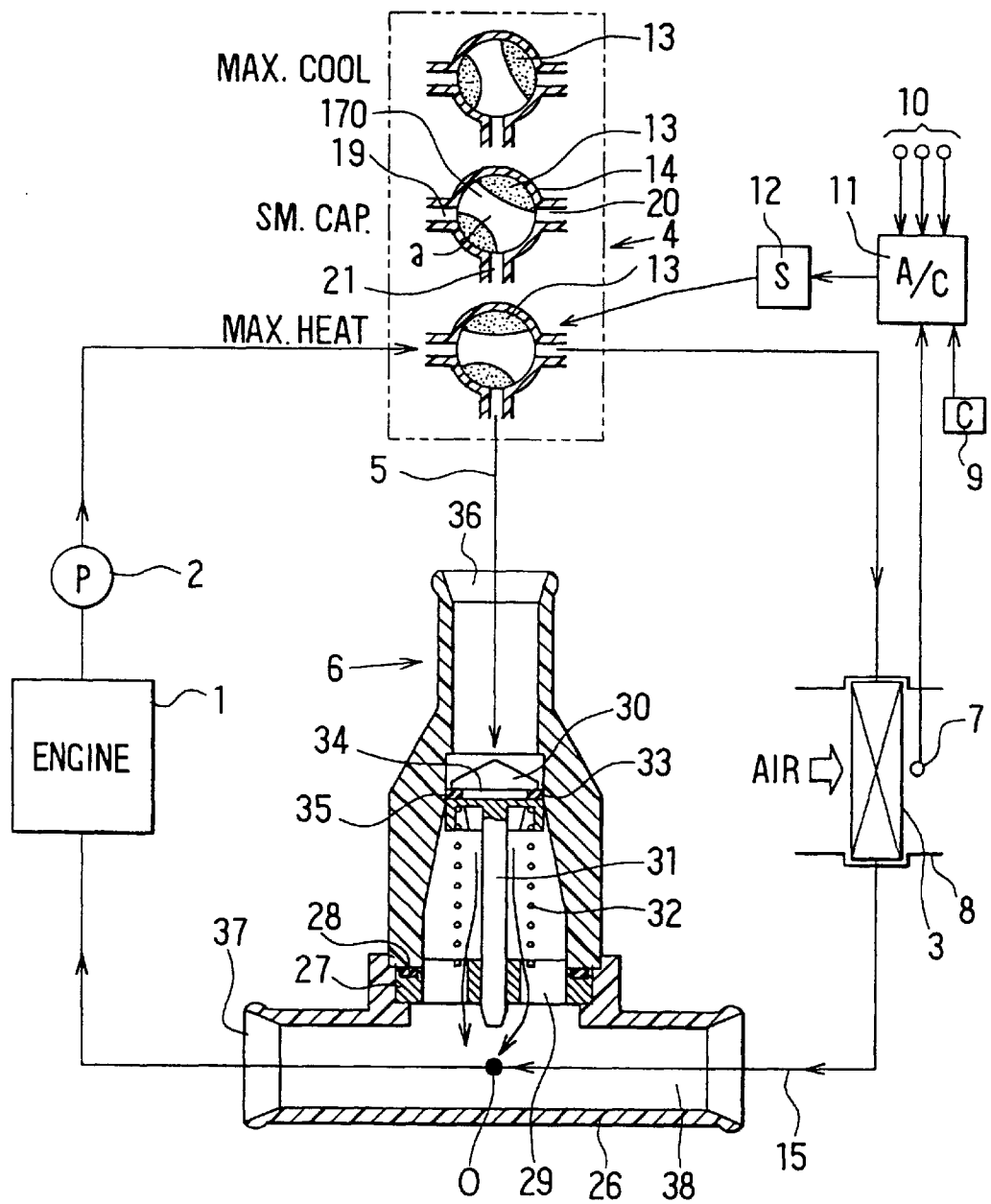
FIG. 4 is a hot water circuit diagram showing a third preferred embodiment of the present invention.

In the first and the second embodiments, the bypass side hot water and the returning hot water from the heat exchanger 3 are merged from the different directions in which one direction is shifted by 180° from the other. On the other hand, in the third embodiment shown in FIG. 4, the hot water flow passage in the housing 26 in the lower side is formed linearly toward the outlet 37 from the inlet 38 and the bypass side hot water can merge from a perpendicular direction with respect to the flow of the returning hot water from the heat exchanger 3.

According to the third embodiment, because the bypass side hot water merges from the perpendicular direction with respect to the flow of the returning hot water from the heat exchanger 3, compared with the first and second embodiments, the blocking operation of the flow of the returning hot water is reduced; however, compared with a case when the flow of the returning hot water and the bypass side hot water merge in parallel, the blocking operation of the returning hot water can be sufficiently obtained so that the rise of the temperature of the blown air can be controlled when the engine is at a high rotational speed.

(Fourth Embodiment)

Figure 7:
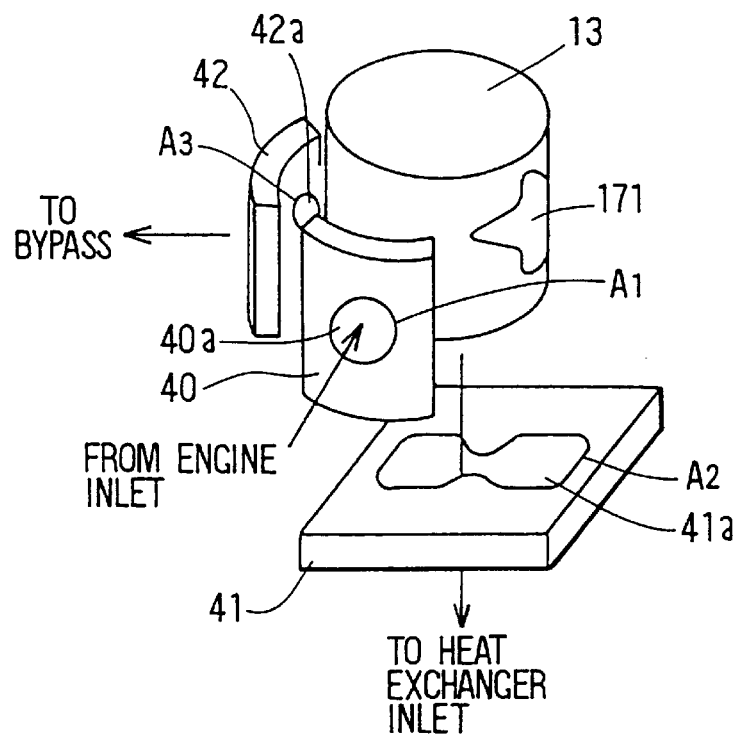
FIG. 7 is a perspective view showing a valve body portion of the flow control valve according to the fourth embodiment.
Figure 5:
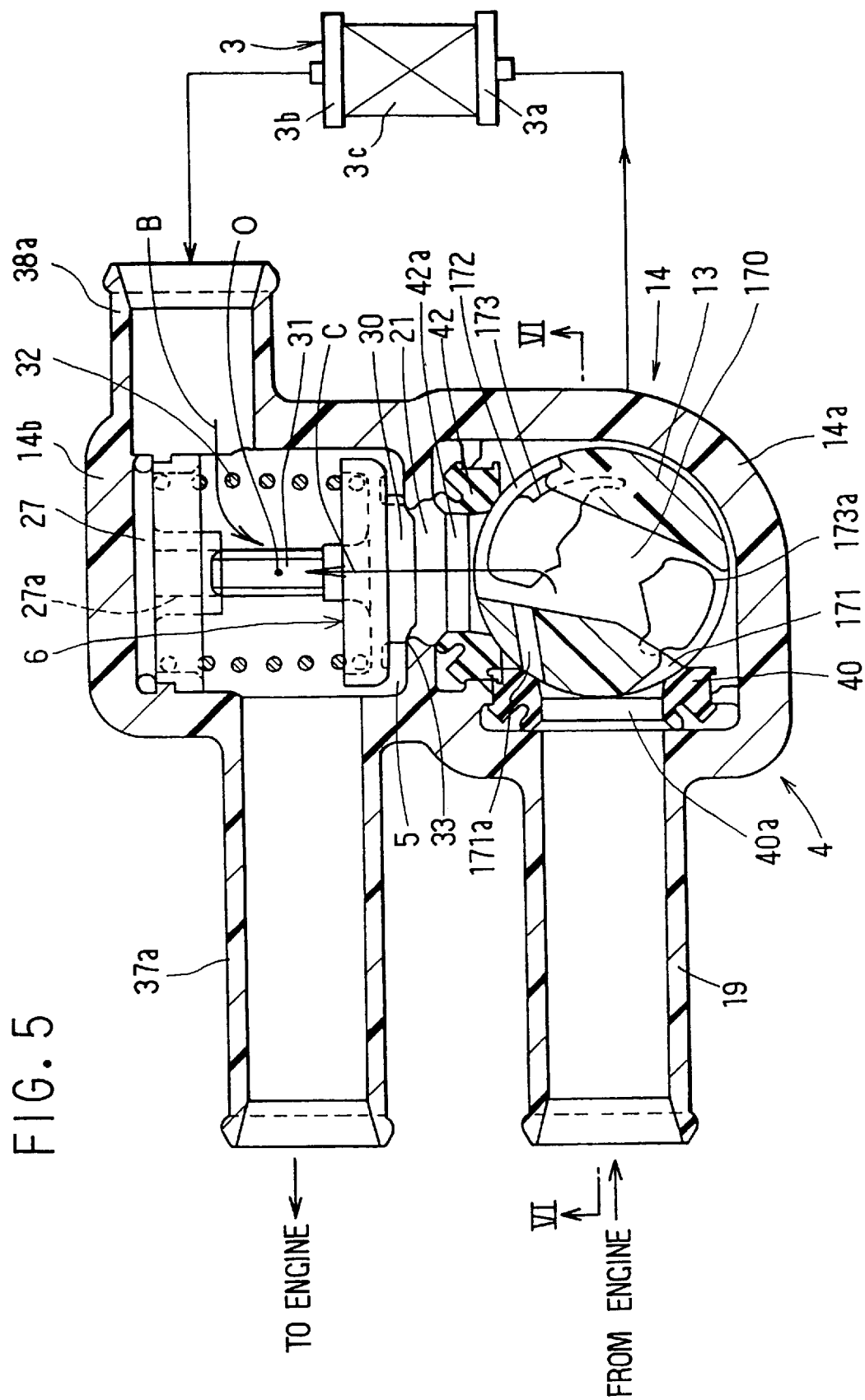
FIG. 5 is a cross-sectional view showing an integrated flow control valve and constant differential valve according to a fourth preferred embodiment of the present invention.
Figure 6:
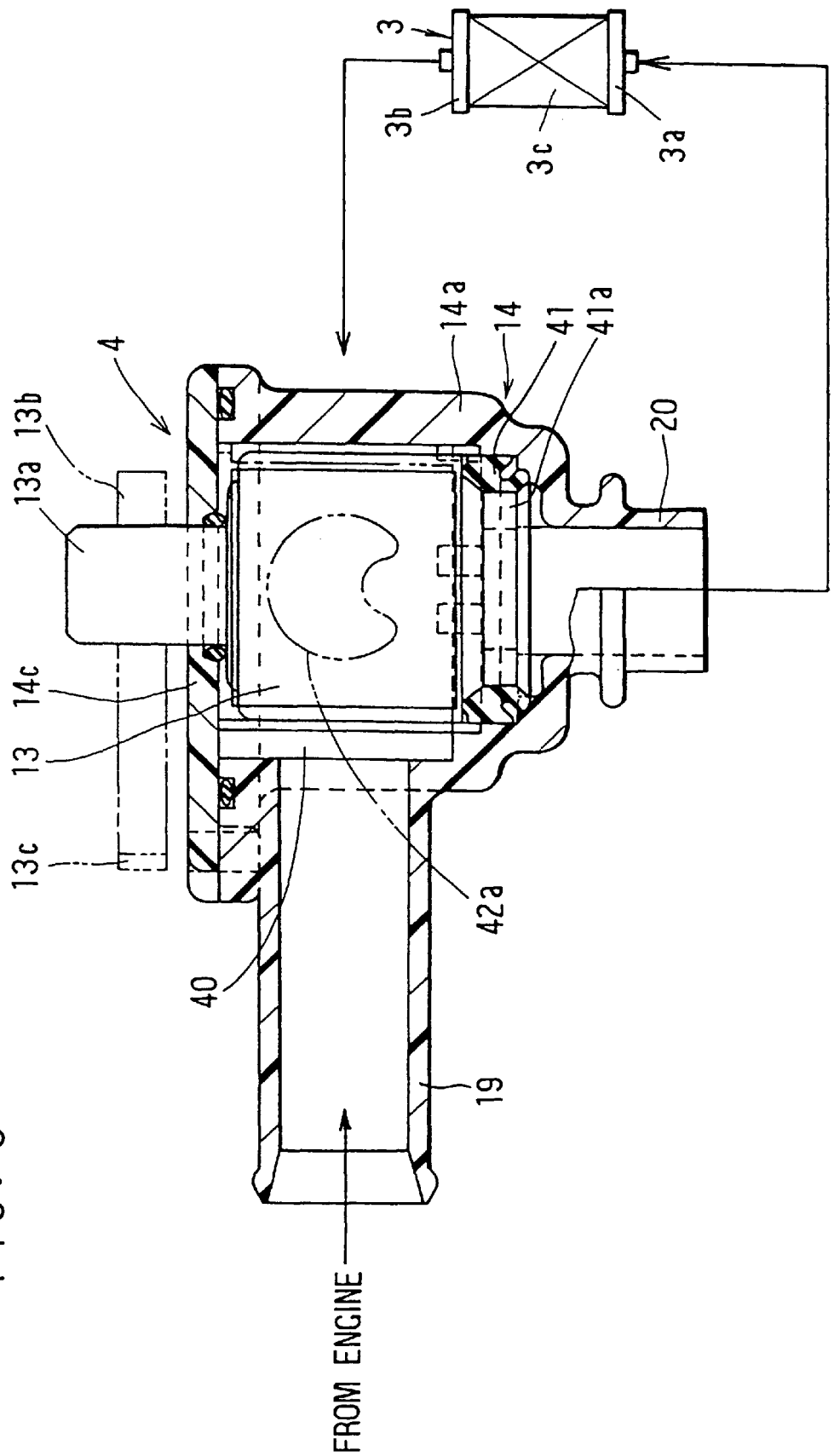
FIG. 6 is a cross-sectional view taken along line VI—VI of FIG. 5.

In the first through third embodiments, although an application in which the flow control valve 4 and the constant differential pressure valve 6 are constructed separately is shown, the fourth embodiment shown in FIGS. 5 through 7 describes a case where the flow control valve 4 and the constant differential pressure valve 6 are integrated.

FIGS. 5 and 6 show the flow control valve 4 integral with the constant differential pressure valve 6, and the valve body 13 of the flow control valve 4 made of resin material is formed in a cylindrical shape and the valve housing 14 is also made of resin. The valve housing 14 has a first receiving portion 14a, and the first receiving portion 14a is formed in a substantially cylindrical configuration extending in a vertical direction in FIG. 5. The cylindrical valve body 13 is rotatably disposed and received in the first receiving portion 14a.

A second receiving portion 14b receiving the constant differential pressure valve 6 is integrally formed by adjoining the first receiving portion 14a in the valve housing 14. A lid 14c made of resin is mounted detachably on an upper opening end portion of the first and second receiving portions 14a and 14b by screws (not shown) or the like, and the upper opening end portions of the first and second receiving portions 14a and 14b are sealed tightly by the lid 14c.

The first hot water inlet pipe 19 in which the hot water from the engine 1 flows, the first hot water outlet pipe 20 where the hot water flowing in from the hot water inlet pipe 19 is discharged toward the heat exchanger 3 and the bypass opening 21 where the hot water is discharged toward the bypass circuit 5 of the heat exchanger 3 are integrally formed in the first receiving portion 14a in the valve housing 14.

In the present embodiment, the first hot water inlet pipe 19 and the bypass opening 21 are disposed at a predetermined interval on a circumferential surface of the first receiving portion 14a with a substantially perpendicular position relation. The first hot water outlet pipe 20 is disposed on an end surface (bottom surface side in FIG. 6) in the axial direction of the first receiving portion 14a.

Furthermore, a second hot water inlet pipe 38a (which is equivalent to the inlet 38 of the constant differential pressure valve housing 26 in the first through third embodiments) in which the returning hot water discharged from the heat exchanger 3 and a second hot water outlet pipe 37a (which is equivalent to the outlet 37 of the constant differential pressure valve housing 26 in the first through third embodiments) for returning the hot water to the engine 1 are integrally formed on the second receiving portion 14b. Therefore, in the present embodiment, the bypass circuit 5 of the heat exchanger 3 is formed in the second receiving portion 14b.

The constant differential pressure valve 6 has the valve body 30 for opening and closing the bypass opening 21 and in the valve body 30, a spring force of the coil spring 32 is operated in a closed valve direction (downward in FIG. 5). An upper end portion of the coil spring 32 is supported by the seat plate 27 and the seat plate 27 is attached to an inner wall surface of the second receiving portion 14b by the spring force. A cylindrical portion 27a is formed at a center portion of the seat plate 27 and an upper end portion of the axial portion 31 which is formed integrally with the valve body 30 is slidably joined to the cylindrical portion 27a and helps the valve body 30 move up and down.

When the differential pressure across the valve body 30, that is, the hot water differential pressure between the bypass opening 21 and the second hot water inlet pipe 38a reaches a predetermined value, the valve body 30 moves upward in FIG. 5 by opposing the force of the spring 32 and separates from the valve seat 33, so that the valve body 30 opens.

A shaft 13a for rotatably operating the valve body 13 is integrally formed on the end portion of the circular valve body 13 in the axial direction. The shaft 13a protrudes outside of the valve housing 14 by passing the lid plate 14c. An end portion of the shaft 13a, which protrudes to the outside, is connected to an electric actuator such as the servo 12 (refer to FIGS. 1, 3 and 4) or a manual operating mechanism using a lever, wire or the like, so that the valve body 13 can be rotatably operated by these devices.

In an application shown in FIG. 6, a central portion of rotation of a fan-shaped gear 13b is integrally connected to the end portion of the shaft 13a protruding to the outside. A reduction gear (not shown) rotatably driven by the servo 12 is engaged with a gear surface 13c of an outer peripheral portion of the fan-shaped gear 13b, so that rotational force of the servo 12 is transmitted to the shaft 13a through the fan-shaped gear 13b.

Reference numerals 40, 41 and 42 are seal members which are made of an elastic material such as rubber or the like and a whole shape thereof is formed in a rectangle as shown in FIG. 7. Central portions of the seal members 40, 41 and 42 have hole portions 40a, 41a and 42a respectively. The seal members 40 and 42 are disposed between the outer peripheral surface of the valve body 13 and the inner peripheral surface of the first receiving portion 14a of the housing 14. The seal member 41 is disposed between end surfaces in the axial direction of the valve body 13 and the first receiving portion 14a.

The seal members 40, 41 and 42 prevent hot water from flowing directly among pipes 19 and 20 and the bypass opening 21 without passing through the control passage 170 of the valve body 13 and form a restriction in the hot water passage due to a communicating shape between the hole portions 40a, 41a and 42a and the control passage 170 of the valve body 13.

Figure 8:
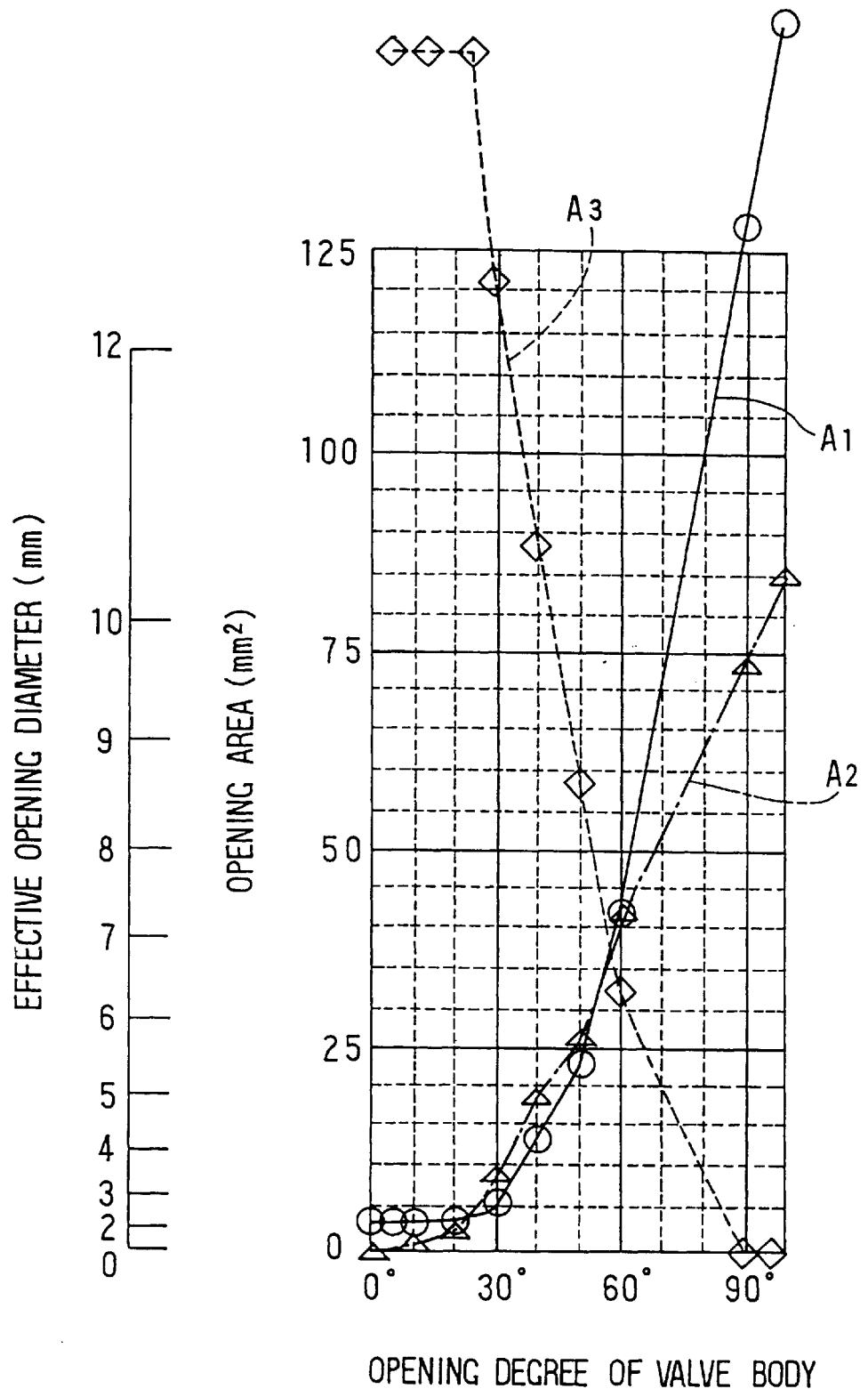
FIG. 8 is a graph of an opening of the valve body of the flow control valve in the fourth embodiment.

In the present embodiment, opening areas A1, A2 and A3 of the pipes 19 and 20 and the bypass opening 21 are controlled by maintaining a specified mutual relationship shown in FIG. 8 due to the control passage 170 corresponding to an opening degree (valve body rotational angle) of the valve body 13. Here, A1 is the opening area of the first hot water inlet pipe 19, A2 is the opening area of the first hot water outlet pipe 20 and A3 is the opening area of the bypass opening 21.

In order to realize the mutual relationship shown in FIG. 8, detailed shapes of the control passage 170 of the valve body 13 and the hole portions 40a, 41a and 42a of the seal members 40, 41 and 42 are set as in the following description.

Inlet side opening portions 171 and 171a and a bypass side opening portion 172 of the control passage 170 are disposed on a circumferential surface of the valve body 13. The opening areas A1 and A3 of the hot water inlet pipe 19 and the bypass opening 21 are regulated by the inlet side opening portions 171 and 171a and the bypass side opening portion 172. The inlet side opening portions 171 and 171a of the control passage 170 change the communicating shape between the circular hole portion 40a of the seal member 40. The inlet side opening portion 171 has a beak shape as shown in the figure. The inlet opening portion 171a has a circular hole shape equivalent to φ2 and can communicate with the hole portion 40a even when the valve body opening degree is zero (a time of stopping of heating).

The bypass side opening portion 172 is rectangular, while the hole portion 42a of the seal member 42 communicating with the bypass side opening portion 172 is circular.

Two opening portions 173 and 173a are disposed on the end portion of the valve body 13 in the axial direction as an outlet side opening portion of the control passage 170 and the opening area A2 of the hot water outlet pipe 20 is regulated by the outlet side opening portions 173 and 173a. The outlet side opening portions 173 and 173a of the control passage 170 of the valve body 13 change a communicating shape of the hole portion 41a of the seal member 41, and the hole portion 41a is a slender rectangle passing through the rotational center of the valve body 13 and the rotational central potion of the valve body 13 has an even more slender shape.

The outlet side opening portion 173 and 173a of the valve body 13 are disposed on a maximum cooling (stopping of heating) position (valve body opening degree=0°) to hold the hole portion 41a in the middle thereof.

As understood from the above description, the restriction for hot water from the hot water inlet pipe 19 is formed by the inlet side opening portion 171 and 171a of the valve body 13 and the hole portion 23a of the seal member 23 and the restriction of hot water to the hot water outlet pipe 20 is formed by the outlet side opening portions 172 and 172a of the valve body 13 and the hole portion 24a of the seal member 24. In FIGS. 7 and 8, reference numerals A1 through A3 show the opening area of each restriction.

In the fourth embodiment, the constant differential pressure valve 6 is integrated with the flow control valve 4 with the above-described structure, and next, the structure of the merging portion "O" of the bypass side hot water and the returning hot water from the heat exchanger 3 is explained. As shown in FIG. 5, the second receiving portion 14b of the valve housing 14 bends the passage shape of the second hot water inlet pipe 38a in which the returning hot water from the heat exchanger 3 in an L-shape.

Therefore, the returning hot water from the heat exchanger 3 flows in the passage of the second hot water inlet pipe 38a by curving downward in FIG. 5 as indicated with an arrow B. On the other hand, the bypass side hot water flows upward in FIG. 5 as indicated with an arrow C. Therefore, the bypass side hot water and the returning hot water from the heat exchanger 3 merge from the opposite direction in which one direction is shifted at substantially 180° from the other.

Thus, in the fourth embodiment, as in the first and second embodiments, the blocking operation of the returning hot water can be provided by the bypass side hot water.

In the fourth embodiment, the heat exchanger 3 has an inlet side tank 3*a* for hot water at a lower portion thereof and an outlet side tank 3*b* for hot water at an upper portion thereof. A core portion 3*c* for exchanging heat between the hot water and the blown air is formed between both tanks 3*a* and 3*b* which are disposed in an up-and-down direction. Here, the core portion 3*c* is constructed as a one-way flowing (full pass) type in which the hot water flows only from the inlet side tank 3*a* to the outlet side tank 3*b*.

(Fifth Embodiment)

Figure 9:
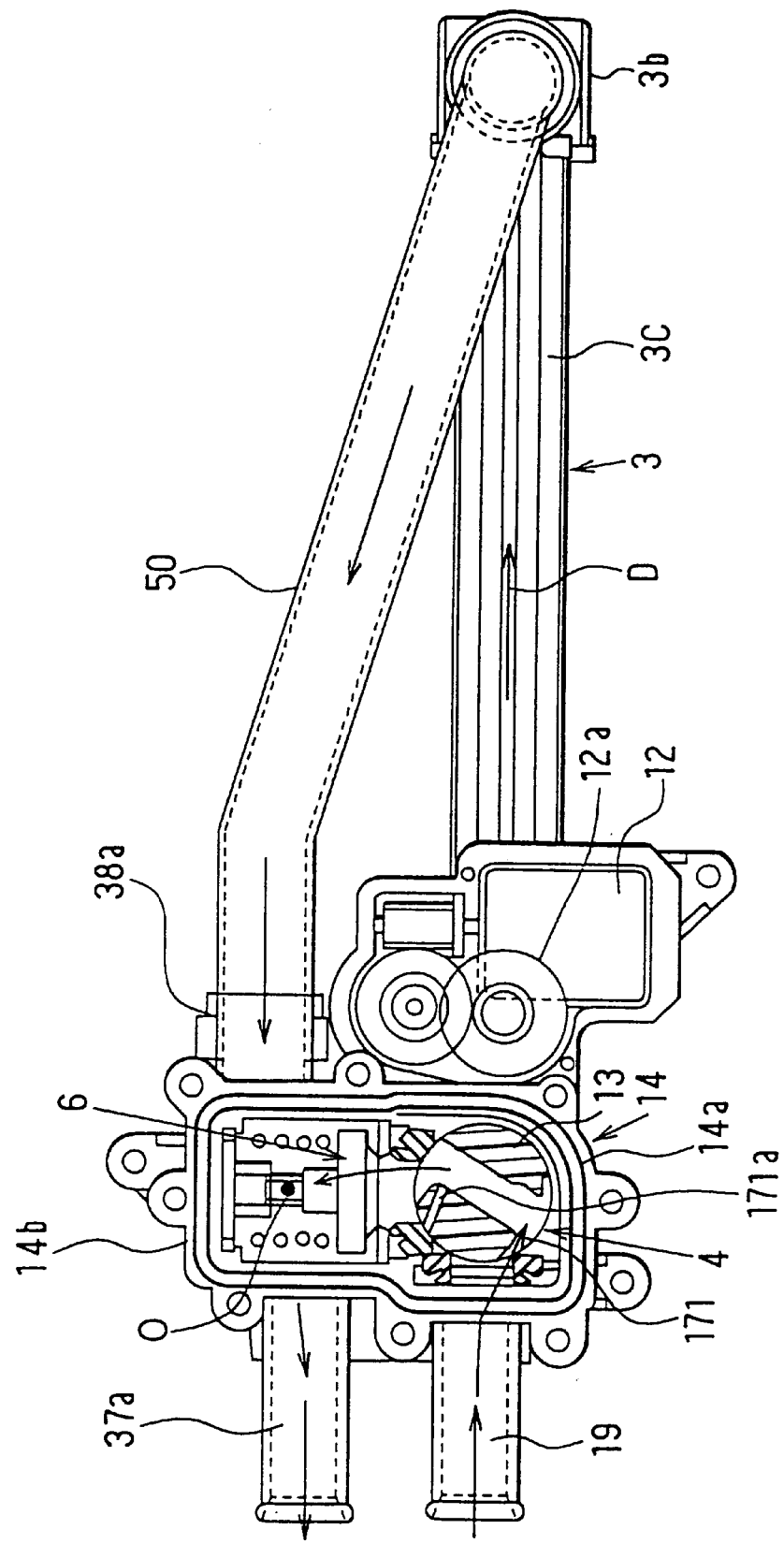
FIG. 9 is a top view showing the integrated construction of the flow control valve and the heat exchanger according to a fifth preferred embodiment of the present invention with a lid of the flow control valve removed.
Figure 10:
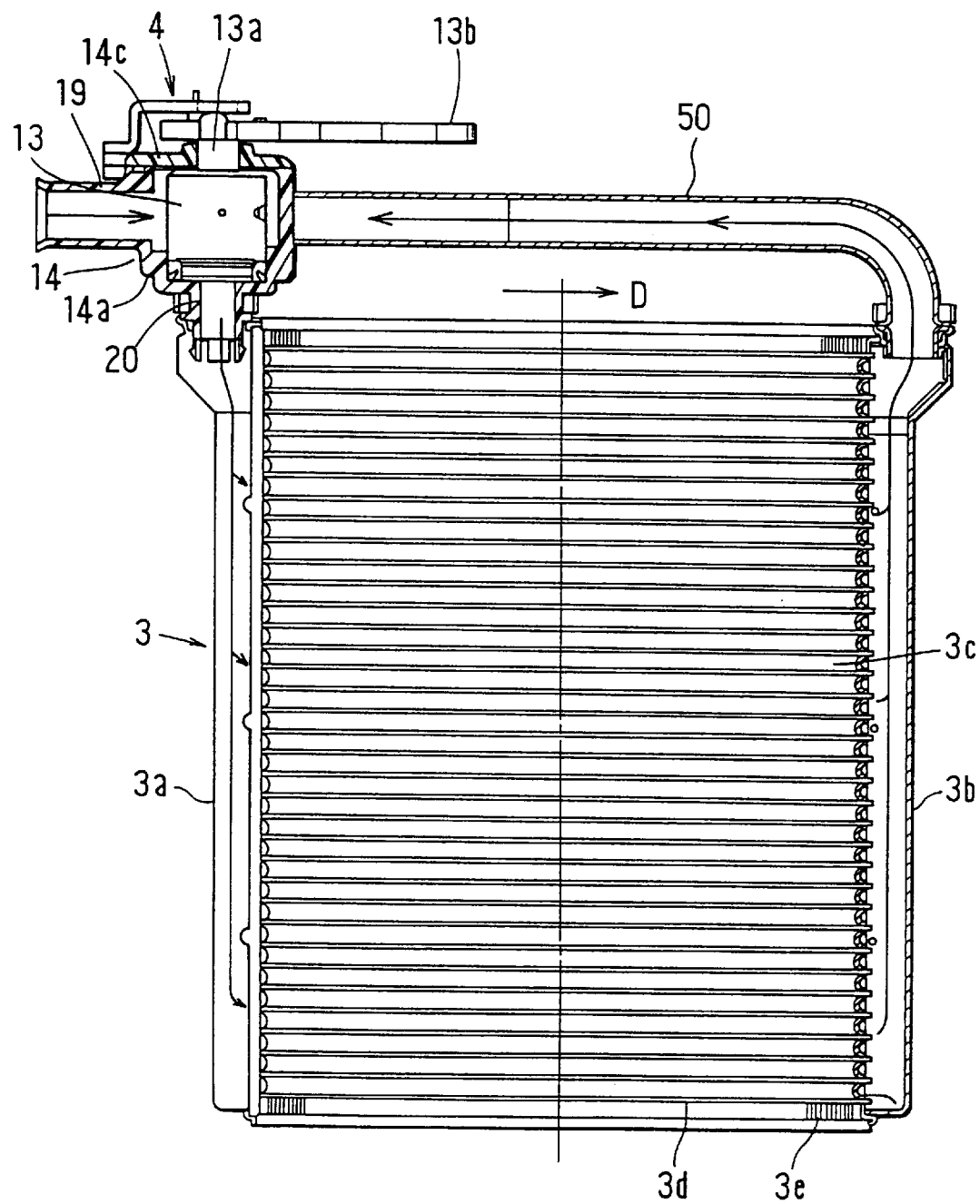
FIG. 10 is a cross-sectional view showing a portion of FIG. 9.

FIGS. 9 and 10 show a fifth embodiment in which the servo 12 is provided integrally with the flow control valve 4 integrated with the constant differential pressure valve 6 as described above in connection with the fourth embodiment. Further, the devices 4, 6 and 12 are integrated with the heat exchanger 3 in advance, and later, the resultant integrated structure is assembled with respect to the blown air duct (heater case) 8 so that assembling performance can be improved and the size of the heat exchanger can be minimized.

In FIGS. 9 and 10, the constant differential pressure valve 6 and the flow control valve 4 are the same as in the fourth embodiment, so the explanation thereof is omitted. For explaining a connecting relationship between the heat exchanger 3 and the servo 12, the core portion 3*c* of the heat exchanger 3 is constructed as the one-way flowing type (full pass) in which the hot water flows only from the inlet side tank 3*a* to the outlet side tank 3*b* and a lot of flat tubes 3*d* and corrugated fins 3*e* which are disposed in parallel are provided on the core portion 3*c*.

The hot water pipe 50 connects an end of the outlet side tank 3*b* of the heat exchanger 3 with the second hot water inlet pipe 38*a* integrally formed at the second receiving portion 14*b* of the valve housing 14 of the flow control valve 4. The hot water outlet pipe 20 integrally formed at the first receiving portion 14*a* of the valve housing 14 is directly connected to the end of the inlet side tank 3*a* of the heat exchanger 3.

In FIG. 10, the description of the servo 12 is omitted. The rotation of the servo 12 is transmitted to the fan-shaped gear 13*b* connected to the shaft 13*a* of the valve body 13 of the flow control valve 4 through a reduction gear mechanism 12*a* shown in FIG. 9.

In the fifth embodiment, the constant differential pressure valve 6 and the servo 12 and the like are integrated with the flow control valve 4, and the flow control valve 4 is integrated with the heat exchanger 3.

Figure 11A:
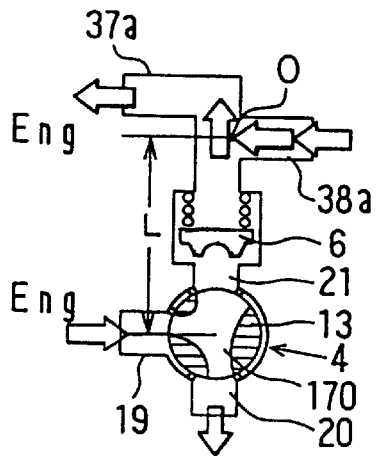
FIGS. 11–11c are a graph showing control of temperature fluctuations of blown air according to the present invention.
Figure 11B:
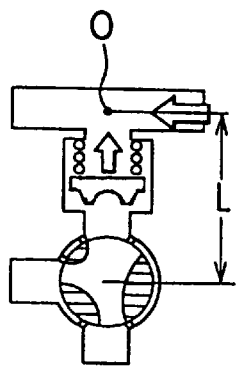
Figure 11C:
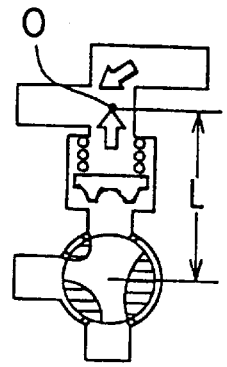
Figure 11:
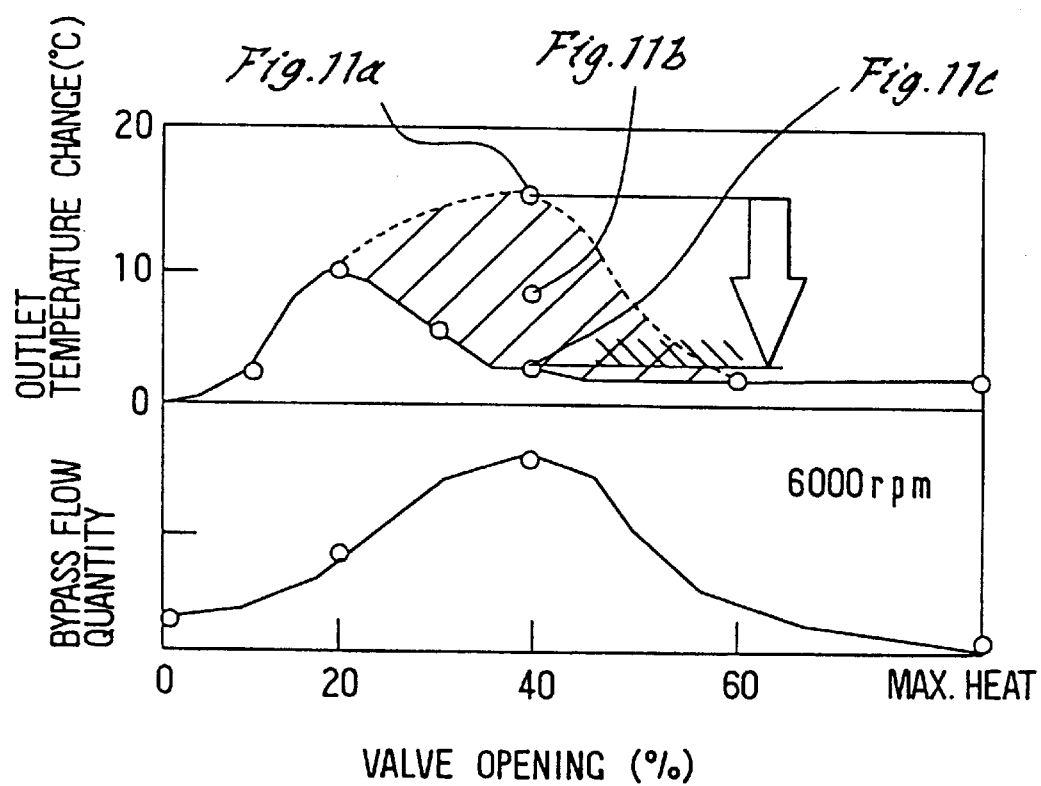

Next, effects of the blocking operation of the returning hot water by the bypass hot water according to the present invention are explained with experimental data. FIG. 11 shows the constant differential pressure valve 6 which is integrated with the flow control valve 4 as in the fourth and fifth embodiments. In sample products of three types from (1) through (3), fluctuation of the temperature of the blown air of the heat exchanger 3 is measured when the rotational speed of the engine is raised up to 6000 rpm from an idling period (rotational speed of the engine: 750 rpm). That is, FIG. 11 shows measurement of fluctuation values of the temperature of the blown air at the rotation speed of engine: 6000 rpm with respect to the temperature of blown air at a time of idling in each valve body opening degree of the flow control valve 4.

The sample product (1) is a type in which the returning hot water from the heat exchanger 3 merges with the bypass side hot water at the merging portion "O" from the opposite direction in which one direction is shifted at substantially 180° from the other and a distance L between the merging portion "O" and a center of the valve body (rotor) 13 of the flow control valve 4 is 42 mm. The sample product (2) is a type in which the returning hot water from the heat exchanger 3 and the bypass side hot water merge at the merging portion "O" perpendicularly and a distance L between the merging portion "O" and a center of the valve body (rotor) 13 of the flow control valve 4 is 42 mm. Further, similar to the sample product (2), the sample product (3) is a type in which the returning water from the heat exchanger 3 and the bypass hot water merge at the merging portion "O" perpendicularly and a distance L between the merging portion "O" and a center of the valve body (rotor) 13 is extended to 100 mm.

In FIG. 11, the bypass flowing amount is an amount of bypass side hot water at the rotational speed of engine: 6000 rpm. The flow control valve 4 used in the present embodiment has an opening characteristic shown in FIG. 8. When the opening degree of the valve body 13 is 40°, the bypass flowing amount is maximized (20 liters per minute). The bypass flowing amount at the idling time period is 0.6 liters per minute.

The sample product (1) has the highest blocking effect due to the bypass side hot water so that the temperature fluctuation of the blown air of the heat exchanger 3 can be controlled at 4° C. with respect to the fluctuation of the rotational speed of the engine of 6000 rpm at idling.

The sample product (2) has a blocking effect which is lower than the sample product (1), so that the temperature fluctuation of the blown air of the heat exchanger 3 is 8° C. with respect to the fluctuation of the rotational speed of the engine of 6000 rpm at the idling time period.

The sample product (3) has dynamic pressure of the bypass side hot water at the merging portion "O" due to the expansion of the distance L and the blocking effect is lower than that of the sample product (2). Therefore, the temperature fluctuation of the blown air of the heat exchanger 3 is 16° C. with respect to the fluctuation of the rotational speed of the engine of 6000 rpm at the idling time period.

According to the above-described data, the distance L between the merging portion "O" and a center of the valve body (rotor) 13 of the flow control valve 4 is preferably very small, e.g., 100 mm or less.

When the valve opening degree is at least 60°, the flow amount of the hot water to the heat exchanger 3 increases. Since the blown air temperature of the heat exchanger 3 is saturated, the temperature fluctuation of the blown air due to the fluctuation of the engine rotational speed of any sample product becomes extremely small. Thus, the blocking effect by the bypass hot water according to the present invention is obtained mostly around the middle opening degree of the valve body 13.

(Other Embodiment)

The present invention is not restricted to hot water-type heating device for automotive use and such a hot water-type heating device in which hot water pressure is added to the heat exchanger 3 can be applied to heating devices for many kinds of household use.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A hot water-type heating device comprising:
   a heat exchanger for heating air by exchanging heat between hot water supplied from a hot water supply source and the air;
   a flow control valve for controlling a flow amount of the hot water supplied to the heat exchanger from the hot water supply source;
   a bypass circuit for allowing the hot water to flow therein while bypassing the heat exchanger; a pressure responsive valve for increasing an opening degree of the bypass circuit corresponding to a pressure rise of the hot water supplied from the hot water supply source;
   a bypass side hot water passage through which bypass side hot water discharged from the bypass circuit flows;
   a returning hot water passage through which returning hot water discharged from the heater exchanger flows; and
   a merging portion for merging the bypass side hot water passage with the returning hot water passage and for blocking flow of the returning hot water from the heat exchanger by fluid pressure of the bypass side hot water from the bypass circuit at the merging portion, wherein
   the bypass side hot water and the returning hot water merge with each other at the merging portion and return to the hot water supply source; and
   the returning hot water passage is always open regardless of an operation of the presure responsive valve.

2. A hot water-type heating device according to claim 1, wherein a flowing direction of the bypass side hot water from the bypass circuit faces a flowing direction of the returning hot water from the heat exchanger at the merging portion, so that the bypass side hot water and the returning hot water merge from opposite directions.

3. A hot water-type heating device according to claim 1, wherein a flowing direction of the bypass side hot water from the bypass circuit faces a flowing direction of the returning hot water from the heat exchanger at the merging portion, so that the bypass side hot water and the returning hot water merge perpendicularly.

4. A hot water-type heating device according to claim 1, wherein the pressure-responsive valve is disposed at a merging point between an outlet side hot water passage of the heat exchanger and the bypass circuit and the merging portion is disposed in a housing receiving a valve body of the pressure-responsive valve.

5. A hot water-type heating device according to claim 1, wherein the bypass circuit and the pressure-responsive valve are integrally provided at the flow control valve.

6. A hot water-type heating device according to claim 5, wherein the flow control valve is integrally provided at the heat exchanger.

7. A hot water type heating device according to claim 1, wherein a distance between a central position of the control valve and the merging portion is not greater than 100 mm.

8. A hot water-type heating device according to claim 1, wherein the hot water-type heating device is disposed on a vehicle having a water-cooled type engine as the hot water supply source.

9. A fluid heating device comprising:
   a fluid supply source;
   a heat exchanger for heating air by exchanging heat between fluid supplied from said fluid supply source and said air;
   a heating circuit for allowing said fluid to flow from said hot water supply source to said heat exchanger and from said heat exchanger to said hot water supply source;
   a bypass circuit for allowing said fluid to flow bypassing said heat exchanger;
   a flow control valve for dividing said fluid between said heating circuit and said bypass circuit;
   a pressure responsive valve for increasing an opening degree of the bypass circuit corresponding to a pressure rise of the hot water supplied from the hot water supply source;
   a bypass side hot water passage through which bypass side hot water discharged from the bypass circuit flows:
   a returning hot water passage through which returning hot water discharged from the heater exchanger flows; and
   a merging valve disposed in said heating circuit and said bypass circuit, and merging valve receiving said fluid flow from said heat exchanger and said bypass circuit and directing said fluid flows to said fluid supply source, fluid pressure of said fluid flow from said bypass circuit controlling said fluid flow from said heat exchanger; and wherein
   the returning heat water passage is always open regardless of an operation of the pressure responsive valve.

10. A hot water-type heating device according to claim 1 wherein:
    the pressure-responsive valve is provided inside the bypass side hot water passage;
    the pressure-responsive valve has a shaft portion which extends toward the returning hot water passage;
    a plate member is provided inside the returning hot water passage such that the plate member is substantially adjacent to the merging portion; and
    the plate member has a supporting hole for slidably supporting the shaft portion, and has a plurality of water passage holes to reduce water passage resistance.

11. A hot water-type heating device according to claim 9 wherein:
    the pressure-responsive valve is provided inside the bypass side hot water passage;
    the pressure-responsive valve has a shaft portion which extends toward the returning hot water passage;
    a plate member is provided inside the returning hot water passage such that the plate member is substantially adjacent to the merging portion; and
    the plate member has a supporting hole for slidably supporting the shaft portion, and has a plurality of water passage holes to reduce water passage resistance.

* * * * *